W. Itschner.
Preventing Horses from Kicking.
Nº 96,812. Patented Nov. 16, 1869.
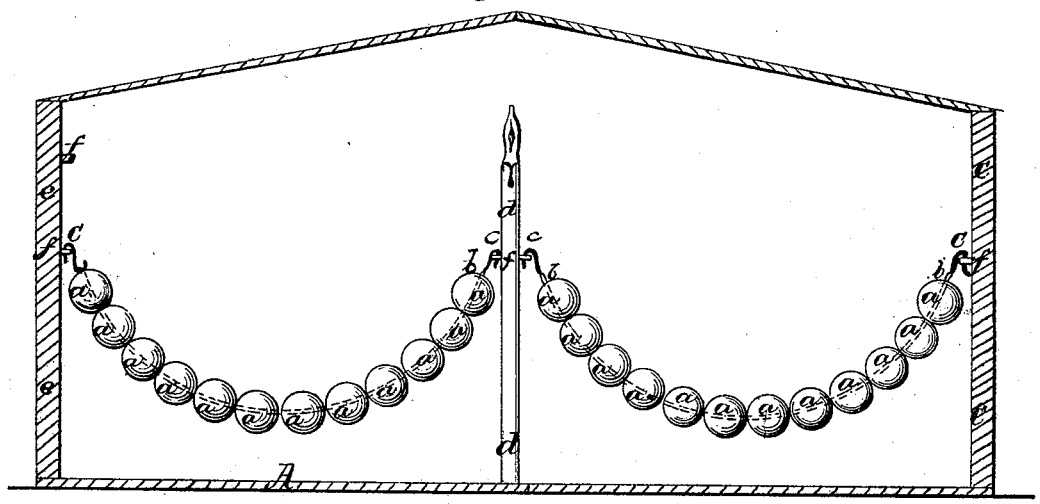
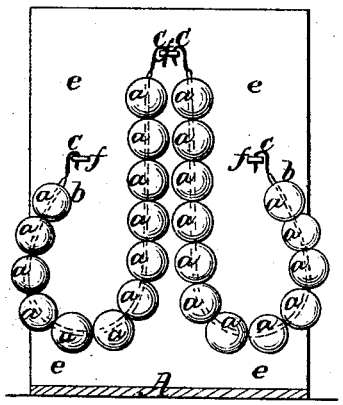
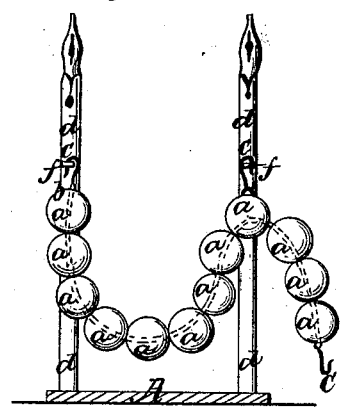
Witnesses:
Inventor:

United States Patent Office.

WERNER ITSCHNER, OF PHILADELPHIA, PENNSYLVANIA.

Letters Patent No. 96,812, dated November 16, 1869.

IMPROVEMENT IN APPARATUS FOR PREVENTING HORSES FROM KICKING IN THE STABLE.

The Schedule referred to in these Letters Patent and making part of the same.

*To all whom it may concern:*

Be it known that I, WERNER ITSCHNER, of Philadelphia, county of Philadelphia, State of Pennsylvania, have invented a new and useful "Apparatus to Prevent Horses from Kicking;" and I do hereby declare that the following is a full, clear, and exact description of the construction and operation of the same, reference being had to the annexed drawings, making part of this specification, in which—

Figure 1 is a longitudinal sectional view.

Figures 2 and 3, transverse sectional views of my apparatus.

The nature of my invention consists in providing stables, where horses are kept, with a self-acting apparatus, which punishes the horse every time he is kicking against it, without hurting him seriously.

This is done by a suitable number of balls, filed on a string, and suspended near the place where the horse is kept.

When he kicks, he must strike the string, the balls will swing back, but recoil at once, and strike the animal two or three times in quick succession.

This punishment comes so quick and so regular after each kicking, that the horse soon gets convinced that it is of no use trying again his vicious pranks.

To enable others skilled in the art to make and use my invention, I will proceed to describe its construction and operation.

I have a number of balls, *a a a a a a a a a a a*, prepared, of about three inches diameter, perforated in the centre, and file them on a string, *b*, which is provided on each end with a hook, *c c*.

For manufacturing these balls, I prefer soft wood, but any other material can be used which is heavy enough to make the shock felt, and to cause some pain, when striking against the body of a horse, but not so ponderous as to hurt him seriously by the recoil of the balls.

This contrivance can be used in three different ways.

First, by stretching it at a proper height, at night-time, across the stable-walk A, from the division-posts *d d*, which mark the entrance to the different stalls, to a point opposite, on the stable-wall, *e e*, figs. 1 and 3. Usually, horses kept in stables are somewhat loosened at nightfall, in order that they may lie down. This enables them to reach each other with their hind legs, and, consequently, there is very often much biting and kicking between them during the night. The results are, disfiguring scratches on the legs of the horses, and trouble to the hostler, whose sleep is disturbed. All this may be avoided by using my invention. The balls, suspended in the aforesaid manner, at a suitable height across the stable-walk, recede, when the horse kicks against them, but they swing back instantly, and punish the horse until he stops kicking. In the morning, the balls can be hung back to the eyes *f f*, into the wall, as shown in fig. 3, that they may be out of the way.

Second, to cure vicious horses from kicking against persons passing through the stable, in day-time, I use my invention in the following manner: I stretch the string, with the balls, from one division-post of the stall to the other, as shown in fig. 2, when, every time the horse kicks against a person passing through the stable, he receives his just punishment by the balls striking his hind legs with considerable force. Experience has shown that this cures his viciousness much better than it can be done by somebody beating him, in anger.

Third, the same contrivance can, with great advantage, be used for divisions between the horses, instead of the board divisions now used in horse-stables. In this case, I use only a heading of boards, to keep the heads of the horses separate, and for the board division, I substitute the string of balls, suspended between that heading and the division-post. This makes a first-class, cheap, and airy stable-division. It gives more room to the horses; they cannot scratch against it, nor kick it to pieces, like a common board division; they can easier lie down and get up, and, at the same time, they will be perfectly safe.

In most cases, one row of balls, hung up at a proper height, will be sufficient, but, if desirable, two rows may be used for the same purpose.

What I claim as my invention, and desire to secure by Letters Patent, is—

The apparatus, consisting of a suitable number of balls, *a a a a a a a*, or their equivalents, the string *b*, and the hooks *c c*, substantially in the manner and for the purposes as set forth.

WERNER ITSCHNER.

Witnesses:
HERRMANN SPOERKY,
ALBERT RENE.